S. E. METZGER.
COUPLING.
APPLICATION FILED FEB. 21, 1912.
1,033,187.
Patented July 23, 1912.
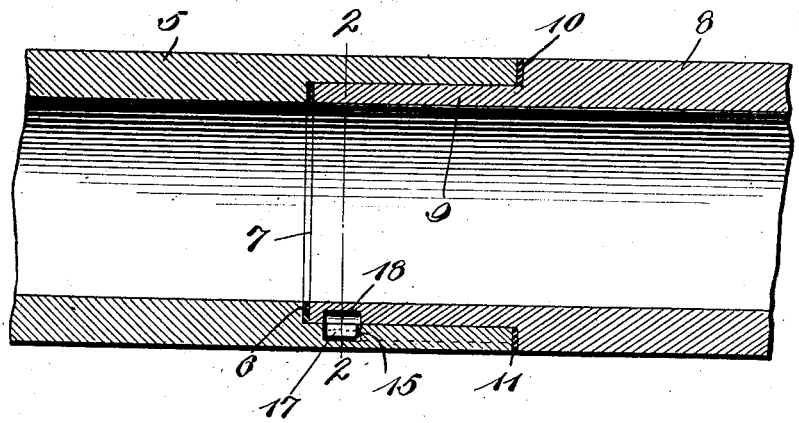
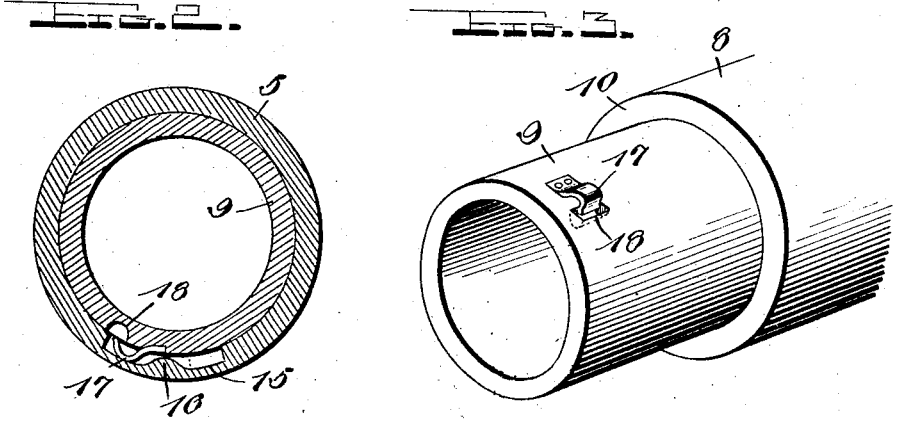
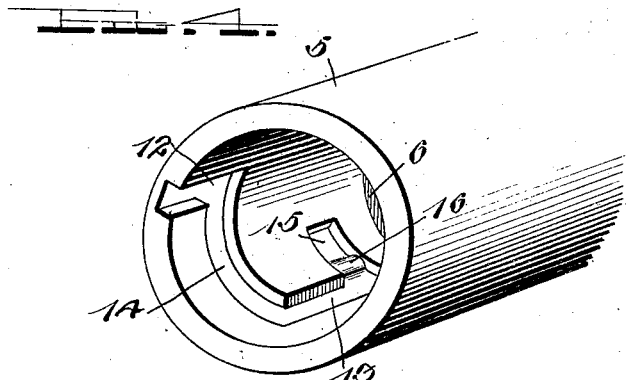
Witnesses
Chas. L. Griestaner.
A. B. Norton.
Inventor
S. E. Metzger,
By Watson E. Coleman.
Attorney the following is a specification, reference being had to the accompanying drawings.

UNITED STATES PATENT OFFICE.

SHERMAN E. METZGER, OF SILVER LAKE, INDIANA.

COUPLING.

1,033,187.  Specification of Letters Patent.  Patented July 23, 1912.

Application filed February 21, 1912. Serial No. 679,205.

*To all whom it may concern:*

Be it known that I, SHERMAN E. METZGER, a citizen of the United States, residing at Silver Lake, in the county of Kosciusko and State of Indiana, have invented certain new and useful Improvements in Couplings, of which the following is a specification, reference being had to the accompanying drawings.

This invention relates to couplings and more particularly to an improved hose or pipe coupling, the invention having for its primary object to provide simple and efficient means for securely and quickly coupling the ends of hose or pipe sections together.

Another and more specific object of the invention is to provide a female coupling member having longitudinal and transverse grooves in its inner wall and a male coupling member provided with a locking member for movement in said grooves, the base of one of the transverse grooves in the first named member being provided with means to coöperate with said locking member whereby the coupling members are held against inadvertent or causal relative movement.

With the above and other objects in view, the invention consists of the novel features of construction, combination and arrangement of parts hereinafter fully described and claimed, and illustrated in the accompanying drawings, in which—

Figure 1 is a longitudinal section of a hose or pipe coupling embodying the present invention; Fig. 2 is a section taken on the line 2—2 of Fig. 1; and Figs. 3 and 4 are detail perspective views of the respective coupling heads.

Referring in detail to the drawing 5 designates the female coupling which is provided with an interior annular shoulder 6 formed therein by enlarging the internal diameter of said coupling head at one end. A gasket 7 is arranged against said shoulder upon which the end of the reduced end 9 of the male coupling 8 is adapted to be seated. This reduced end of the coupling head 8 provides an exterior annular shoulder 10 between which and the enlarged end of the coupling head 5 a suitable gasket 11 is arranged. In this manner a practically water-tight joint between the coupling heads is obtained.

The enlarged end of the female coupling head 5 is provided with a groove or channel including outer and inner longitudinally extending portions 12 and 13 respectively and outer and inner transverse portions 14 and 15. The longitudinal portions of this groove or channel are disposed out of alinement and the outer end of the portion 13 is connected to the inner end of the portion 12 of the groove by means of the transverse outer portion 14 thereof. The inner transversely extending end 15 of this groove or channel is comparatively short and the base wall thereof where the same is connected to the longitudinal groove portion 13 is provided with a projection or protuberance 16.

Upon the periphery of the reduced end portion 9 of the male coupling head 8 a heavy leaf spring 17 is riveted or otherwise rigidly secured at one of its ends, the free end of said spring being adapted to be received in a notch or recess 18 provided in the periphery of the coupling head when said spring is placed under compression. By means of this construction, it will be readily seen that when the coupling heads are connected, the spring plate 17 on the male coupling head is disposed in the outer longitudinal end portion 12 of the groove or channel in the coupling head 5, and is moved inwardly. The male coupling head is then turned to move the spring plate carried thereby through the transverse outer portion 14 of the channel and is then again forced in a longitudinal direction into the female head through the inner portion 13 of said groove. When the spring 17 is disposed in the inner end of the portion 13 of the groove or channel, considerable force must be applied to the male coupling head in order to turn the same so as to move said spring plate over the projection 16 upon the base wall of the inner transverse portion 15 of the groove in the coupling head 5. In this forced movement of the coupling head, the spring 17 is moved into the recess 18 in the periphery of the male head until said spring has passed over the projection 16 when it again assumes its normal position in the end of the transverse groove portion 15. When the coupling heads have thus been connected, the ends of the heads will be seated against the gaskets 7 and 11 and said heads will retain their relative coupled positions until sufficient rotative force is applied to the heads in opposite directions to move the spring 17 over the projection 16 into the inner end of the longitudinal inner portion 13 of the groove in the female coupling head.

From the foregoing it will be seen that I have devised a very simple, efficient and durable coupling for hose or pipes whereby the sections may be easily and quickly connected. Owing to its simplicity, it will be obvious that the invention can be produced at small cost and is also extremely durable and efficient in practical use. While I have shown and described the preferred construction and arrangement of the various parts, it will be understood that the invention is susceptible of considerable modification without departing from the essential feature or sacrificing any of the advantages thereof.

Having thus described the invention what is claimed is:—

The combination of a female coupling head provided with a groove in its inner wall and having its inner end transversely disposed, said transversely disposed inner end of the groove having a projection formed on its base wall, a male coupling head provided with a reduced portion to be received in the female coupling head, and a leaf spring rigidly fixed at one end to the reduced portion of the male head, said head being provided with a recess in its periphery to receive the free end of said spring, said spring being adapted for movement into the transverse groove portion of the female head and coöperating with said projection to hold said coupling heads against casual relative rotative movement.

In testimony whereof I hereunto affix my signature in the presence of two witnesses.

SHERMAN E. METZGER.

Witnesses:
A. I. URSCHEL,
CALVIN WAY.